(12) United States Patent
Smith

(10) Patent No.: US 10,769,271 B2
(45) Date of Patent: Sep. 8, 2020

(54) APPARATUS FOR CREATING AND STORING PASSWORDS

(71) Applicant: Ande Allen Smith, North Yarmouth, ME (US)

(72) Inventor: Ande Allen Smith, North Yarmouth, ME (US)

(*) Notice: Subject to any disclaimer, the term of this patent is extended or adjusted under 35 U.S.C. 154(b) by 137 days.

(21) Appl. No.: 15/892,449

(22) Filed: Feb. 9, 2018

(65) Prior Publication Data

US 2019/0138710 A1    May 9, 2019

Related U.S. Application Data

(60) Provisional application No. 62/581,156, filed on Nov. 3, 2017.

(51) Int. Cl.
*G06F 21/46* (2013.01)
*G06F 21/78* (2013.01)

(52) U.S. Cl.
CPC .............. *G06F 21/46* (2013.01); *G06F 21/78* (2013.01)

(58) Field of Classification Search
CPC .......... G06F 21/78; G06F 21/45; G06F 21/46; G09C 1/04; G07F 7/10; G07F 7/1041
See application file for complete search history.

(56) References Cited

U.S. PATENT DOCUMENTS

| | | | |
|---|---|---|---|
| 6,729,883 B1 | 5/2004 | Raiche | |
| 8,914,855 B2 | 12/2014 | Whitmyer | |
| 9,189,618 B2 | 11/2015 | Lund | |
| 9,230,092 B1 | 1/2016 | Juels | |
| 9,258,123 B2 * | 2/2016 | Griffin | ............... G06F 21/36 |
| 9,391,778 B2 | 7/2016 | Ignatchenko | |
| 9,483,634 B2 | 11/2016 | Alexander et al. | |
| 9,569,610 B2 | 2/2017 | Aming et al. | |
| 2004/0030933 A1 | 2/2004 | Park | |
| 2005/0233105 A1 | 10/2005 | Downs | |
| 2009/0080652 A1 | 3/2009 | Harding | |
| 2010/0300163 A1 | 12/2010 | Loughin et al. | |
| 2014/0337937 A1 * | 11/2014 | Truskovsky | ............ H04L 63/08 726/5 |

OTHER PUBLICATIONS

International Search Report and Written Opinion in corresponding PCT application No. PCT/US2019/059099, dated Mar. 7, 2019, 8 pp.
Website https://en.wikipedia.org/wiki/Jefferson_disk, last edited Feb. 24, 2019, 6 pp.

* cited by examiner

*Primary Examiner* — Amir Mehrmanesh
(74) *Attorney, Agent, or Firm* — Caseiro Burke LLC; Chris A. Caseiro

(57) ABSTRACT

An apparatus made of wheels arranged axially on a central spindle that are rotated with respect to one another in myriad combinations to create unique, complex passwords for use in computer systems. The wheels are labeled with a randomized selection of characters found on standard computer keyboards, including upper and lower-case characters, numbers, and special characters, together with some or all characters put on colored backgrounds found on each wheel. A memorized master password is used to align the wheels, which reveals a series of unique, complex passwords arrayed across the perimeter of the wheels for use in computer applications. When not in use, the wheels are rotated to a random or storage position, providing for obfuscation of the passwords and allowing the device to be stored in plain sight.

5 Claims, 11 Drawing Sheets

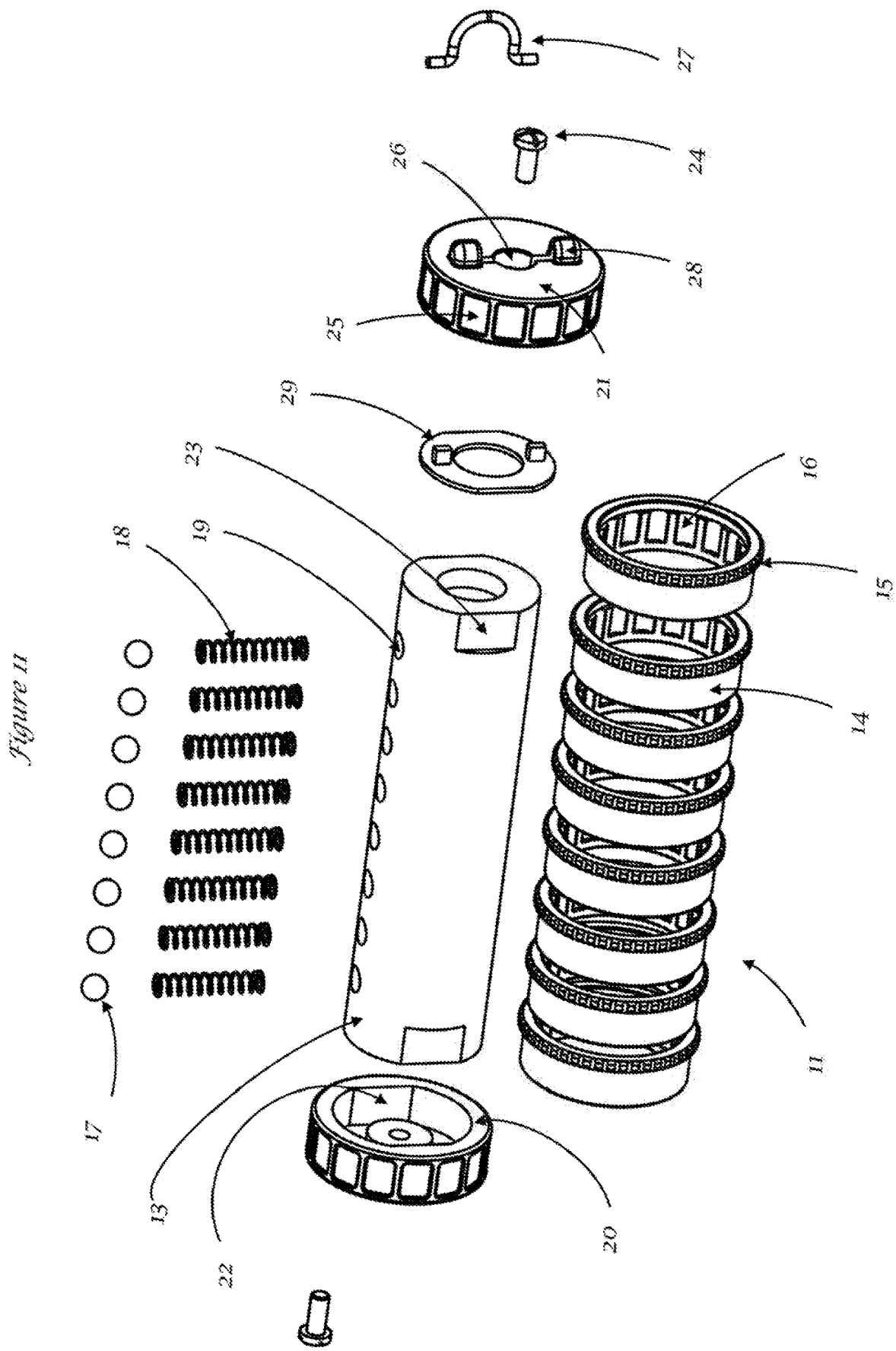

APPARATUS FOR CREATING AND STORING PASSWORDS

CROSS REFERENCE TO RELATED APPLICATION

The present application is a nonprovisional application and claims the priority benefit of U.S. provisional application Ser. No. 62/581,156, filed Nov. 3, 2017, entitled "Apparatus for Creating and Storing Passwords," the entire content of which is incorporated herein by reference.

BACKGROUND OF THE INVENTION

1. Field of the Invention

This disclosure relates generally to computing security, and, more particularly, to an apparatus to securely create passwords and store them.

2. Description of Related Art

Review of other patents reveals no mechanical apparatus aimed to create and store passwords for electronic systems. Various filings cited reveal computer-based and electronic devices and processes for creation and electronic storage, but none teaches the use of a mechanical device or comparable methodology for password creation.

The claimed apparatus does share a facial resemblance to the $18^{th}$-century encryption tool known as a Jefferson Disk. Purportedly invented by Thomas Jefferson, his device used rotating wheels with letters to encrypt a message. In application, the Jefferson Wheel would be rotated to spell out a message in letters only, then another row of text was used as an encrypted text. The message would be decrypted by a second person using another device with identically labeled and sequenced wheels, spelling out the encrypted text, then searching the wheel for the initial plain-text message.

The Jefferson Wheel is clearly distinguishable as unrelated art because it (a) was aimed at encryption of a message whereas the claimed apparatus relies upon a memorized master password and obfuscation for creation and secure storage of relevant passwords on the same device; (b) was conceived to rely upon two identical devices held by two different parties whereas the claimed apparatus uses a single device for one person; and (c) used only letters whereas the claimed apparatus makes potential use of all standard computer keyboard characters.

BRIEF SUMMARY OF THE INVENTION

Despite years of high-profiled computer hacking, the public continues to rely upon passwords and unfortunately continues to either make them easily guessable or write them down, exposing even the most complex passwords to simple theft and loss. In addition, a perverse result of requiring complex passwords to defeat password guessing algorithms is that individuals will often use simple, easily guessable combinations of characters to aid in their remembering these passwords, such as the routine substitution of the letter "a" with the character "@". Currently, many individuals who cannot remember long strings of complex passwords either write them on paper or store them in unencrypted computer files. Some individuals utilize password programs to create and store passwords, but such programs are often perceived as vulnerable to hacking themselves, as too complex and inconvenient for many individuals, and not integrating smoothly with all applications on all software platforms. A simple, yet secure method of creating and storing passwords is needed to protect computer users from easily stolen or guessed passwords.

To avoid the dangers of using simple passwords or writing computer passwords on paper and storing them in places like on a sticky note next to the computer monitor, and to provide an alternative to complicated and expensive software and computer hardware-based techniques for creating and storing passwords, the present invention provides a mechanical tool for creation and storage of passwords, which is accessible to even those with the lowest computer literacy.

The advantage of the present mechanical apparatus is that it does not require power and unlike computer-based systems cannot be accessed by hackers (i.e., it is "air gapped"). It can be readily manipulated to create a multiplicity of passwords and readily obfuscated by randomly arranging the wheels when not in use. This allows the device to be stored conveniently in plain sight near a computer or carried between locations. In comparison to software-based password generation and storage devices that often require highly complex master passwords to avoid online hacking of these systems, the present invention can make use of easy to remember master passwords. This simplicity arises, because typical password cracking, such as library attacks based on algorithmic or brute-force-type attacks, would require access to the physical device by a skilled hacker, thereby limiting the range of threat scenarios for this non-electronic device.

In an embodiment, eight wheels are labeled each with 15 randomly arranged characters on the perimeter comprised of upper and lower-case letters, numbers, and special characters with all characters on each wheel randomly provided with one of 15 different background colors. No colors or characters are repeated on a wheel and each device will be equipped with different arrangements of characters, making no two devices the same. Such an embodiment results in over 1 billion permutations of characters available for passwords uniquely on each device.

A user would devise an easy-to-remember master password (e.g., by using alternating "brown" and "yellow" characters, perhaps chosen based on a favorite sports team's colors or the color of the coat of a favorite pet). The array of wheels would be rotated to reveal the master password. Once aligned with the master password, parallel lines of text would comprise 28 additional complex passwords for use of not less than eight characters in length, 14-each by reading on the parallel lines left to right and then right to left. By way of example, the user might choose that their on-line banking password be the third row below the master password, read left to right. Such third row could have a label affixed in a provided location so that the user would be relieved of remembering what password was to be taken from what row. When not in use, the user would then obfuscate the passwords by randomly arranging the wheels or arranging them in a storage alignment (e.g., aligning all the "red" characters). When needed, the user recreates the hidden passwords by aligning the wheels to recreate the master password and reading the relevant row for the desired banking password.

In the embodiment described above, the wheels are arrayed on a spindle with a ball and spring arrangement that engages detents on the interior face of the wheel, which provides for easy alignment of the wheels with respect to one another and provide an audible "click" consistent with the rotation. The wheels include thumb grips to facilitate rotation. Once aligned, the detent and ball and spring arrangement is engaged to minimize incidental rotation of the wheels from the desired alignment.

BRIEF DESCRIPTION OF THE DRAWINGS

Having thus generally described the nature of the invention, reference will be made to the accompanying drawings, showing by way of illustration a preferred embodiment thereof, and in which:

FIG. 11 is an exploded view of the apparatus in perspective, featuring all constituent parts.

DETAILED DESCRIPTION OF THE EMBODIMENTS

Figure 1:
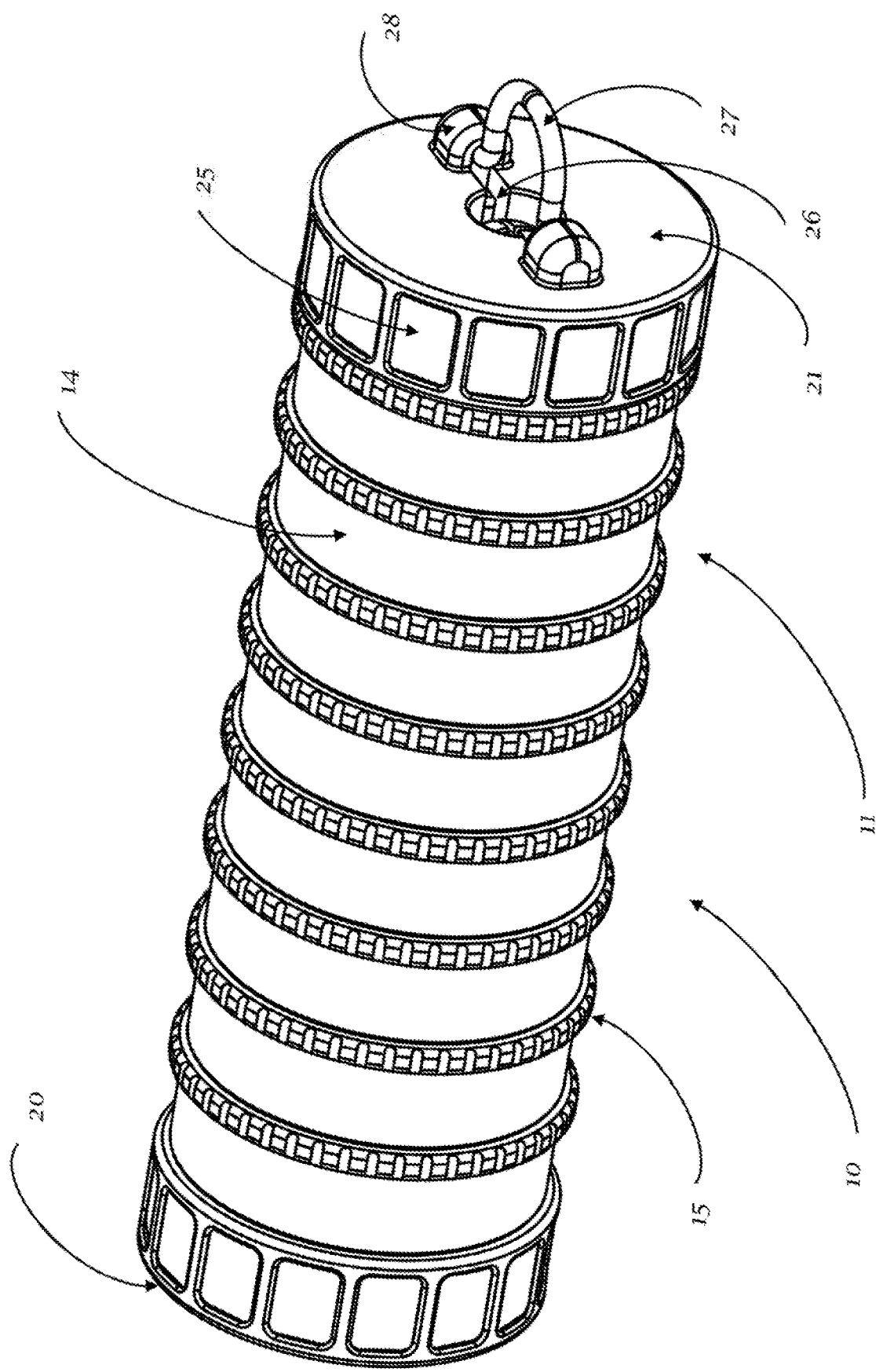
FIG. 1 is a perspective view of the apparatus of the present invention.
Figure 2:
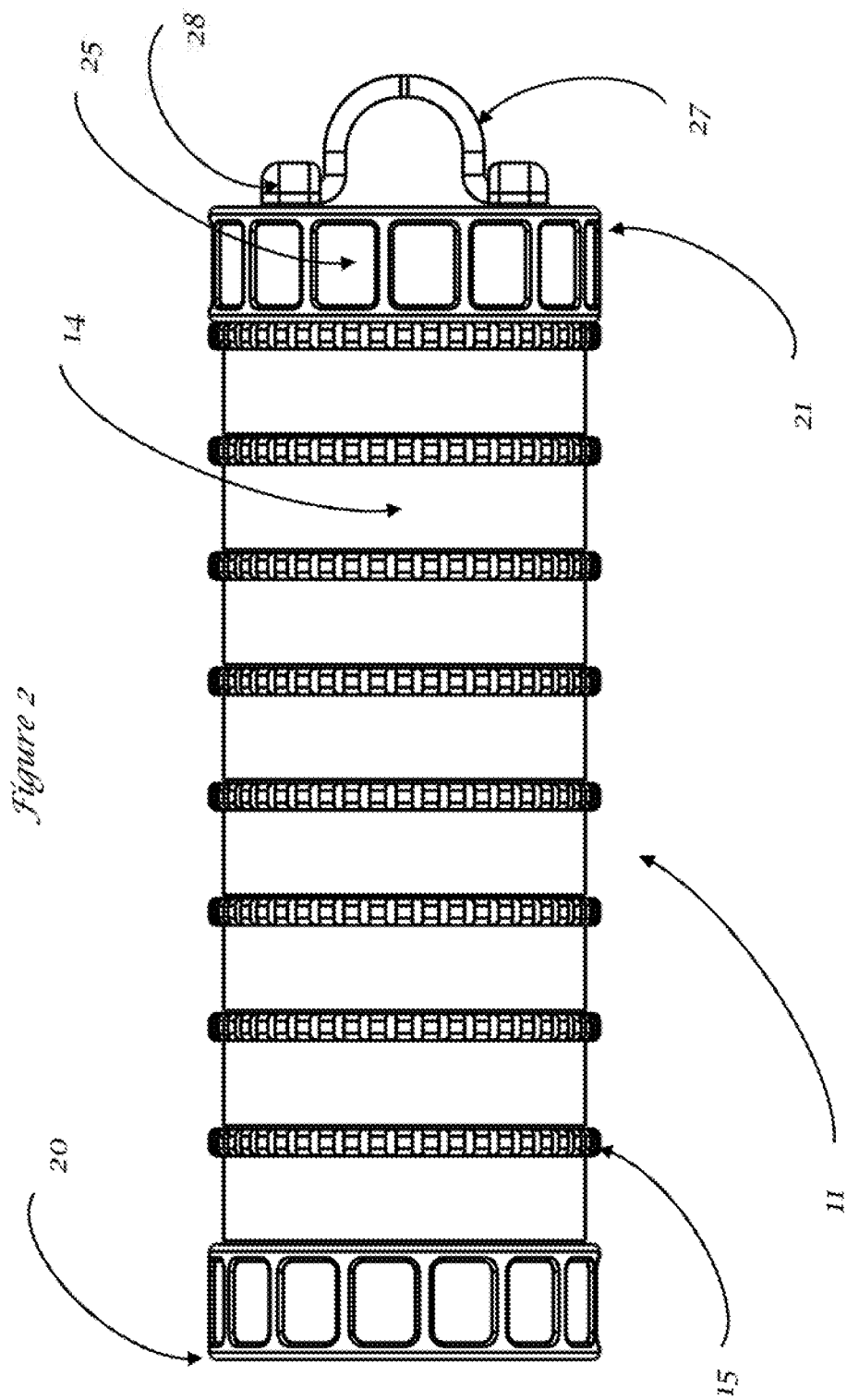
FIG. 2 is a side view of the apparatus when viewed from the radial axis.
Figure 3:
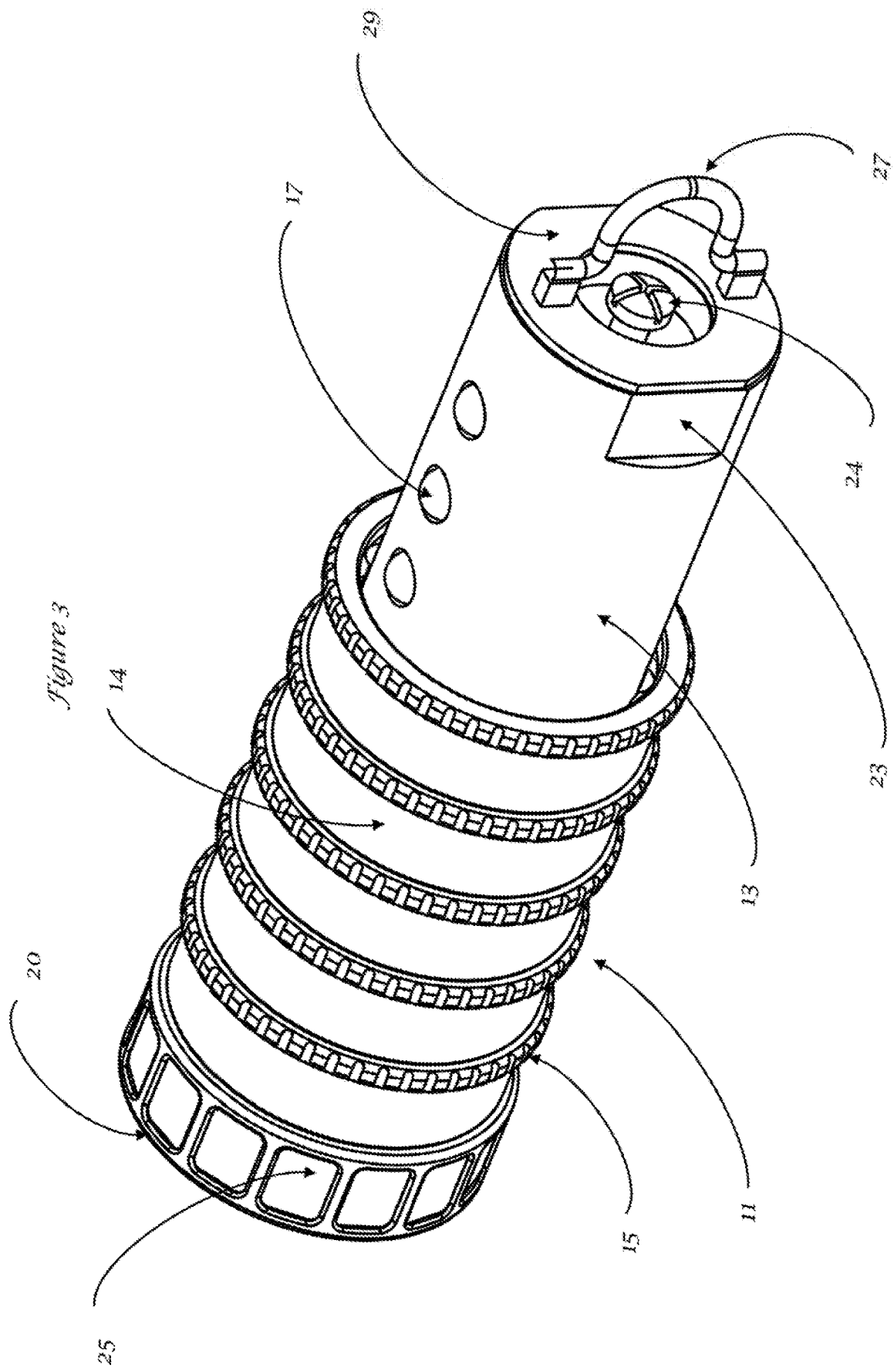
FIG. 3 is a perspective view of the apparatus with several wheels and the right endcap removed, revealing the ball and spring assemblies in their channels as well as the bracket retention plate.
Figure 4:
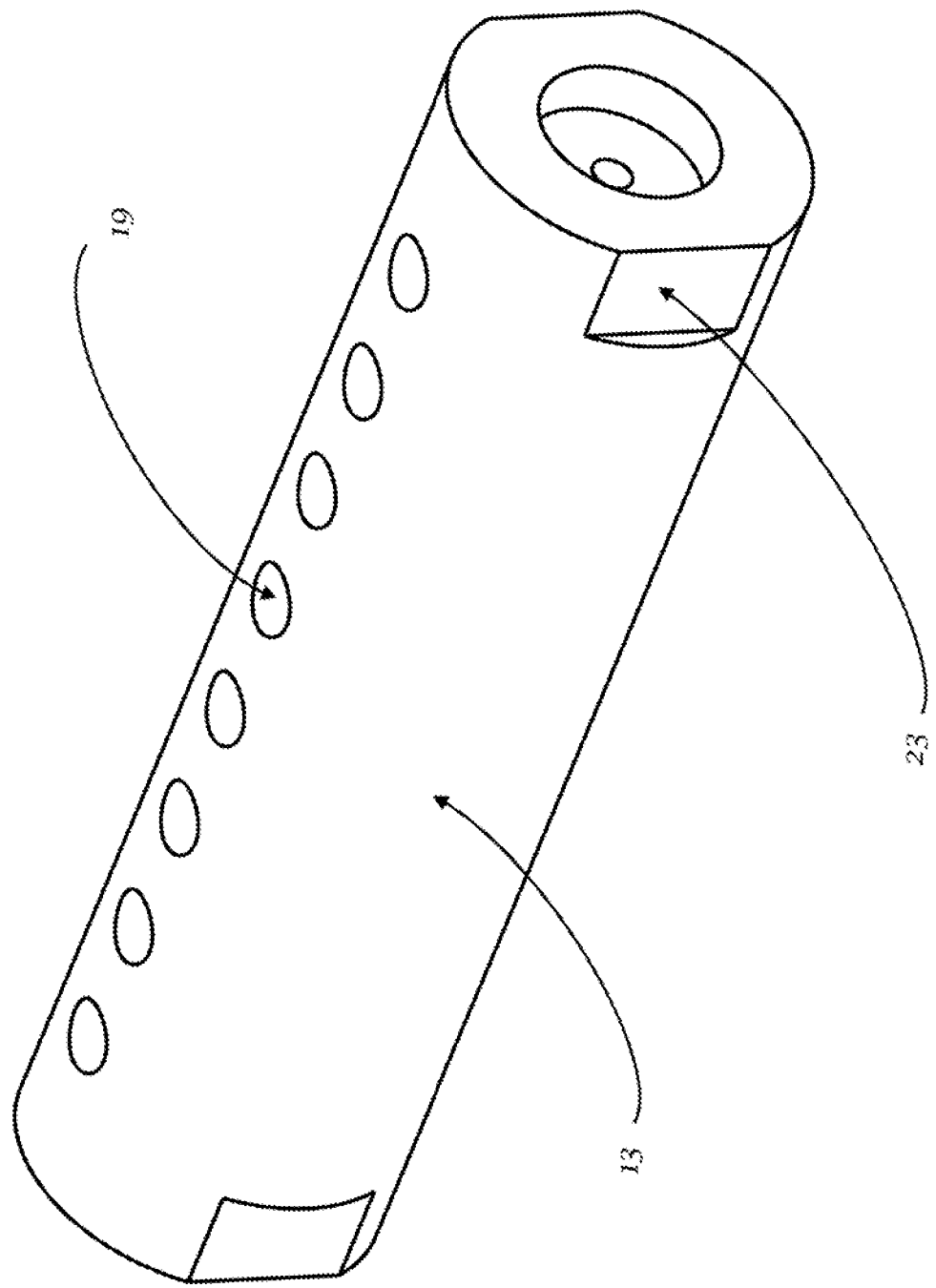
FIG. 4 is a perspective view of the spindle, featuring the longitudinal arrangement of the ball and spring channels and endcap alignment channels.
Figure 5:
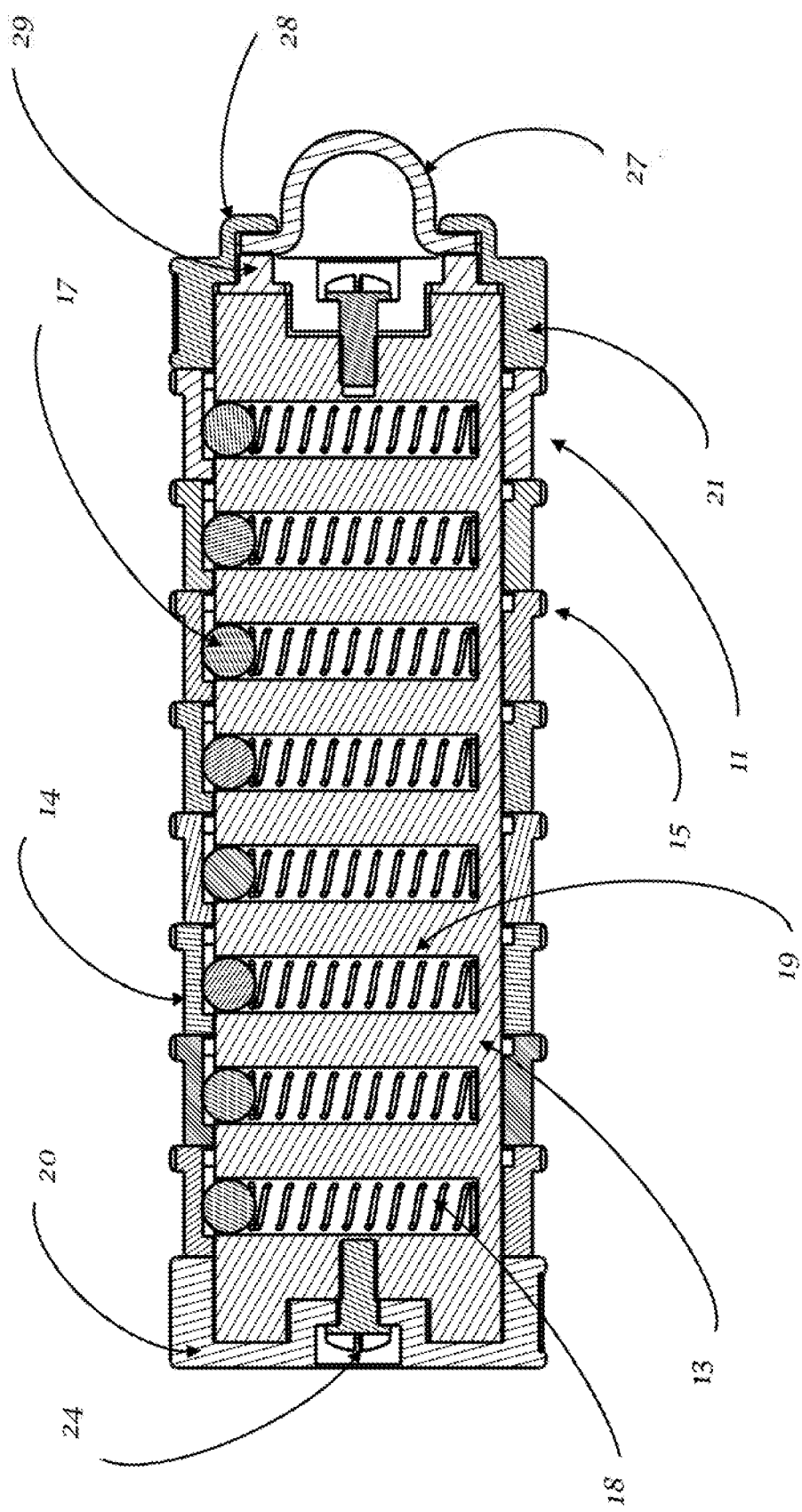
FIG. 5 is a cross-sectional view of the apparatus featuring the ball and spring assemblies in the aligned position of their channels.

A password apparatus 10 of the present invention is shown in FIGS. 1-5 illustrates an embodiment of eight wheels 11. The wheels 11 are each formed as a hollow ring to create a central annular space 12 in order to emplace and rotate them on a central spindle 13. Each wheel 11 is labeled with computer keyboard characters in labeling groove 14. The wheels 11 are also fitted with finger grips 15 to facilitate rotation.

Figure 6:
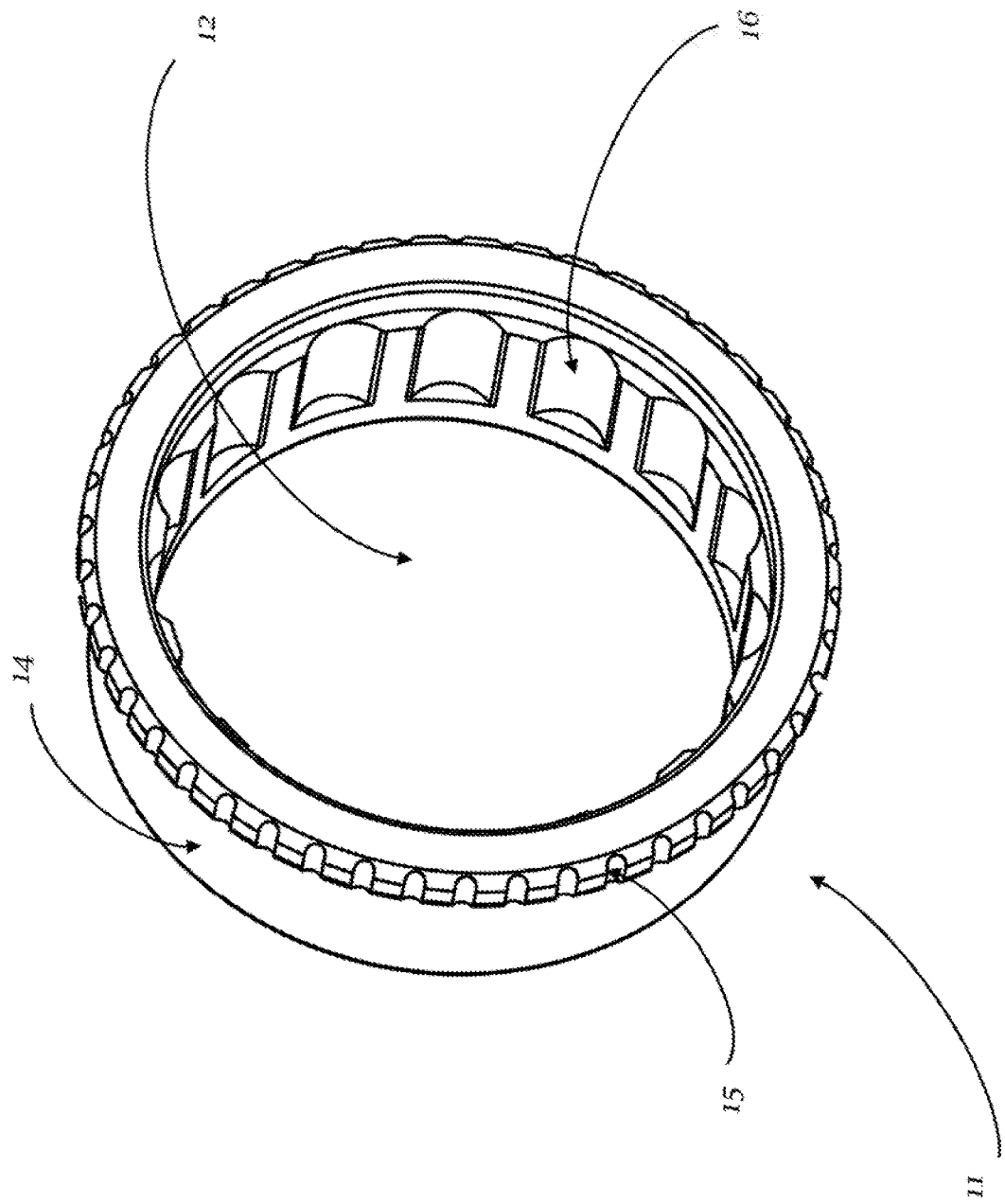
FIG. 6 details the elements of a wheel, viewed in perspective axially, featuring the detents used to position the wheel and maintain alignment.
Figure 7:
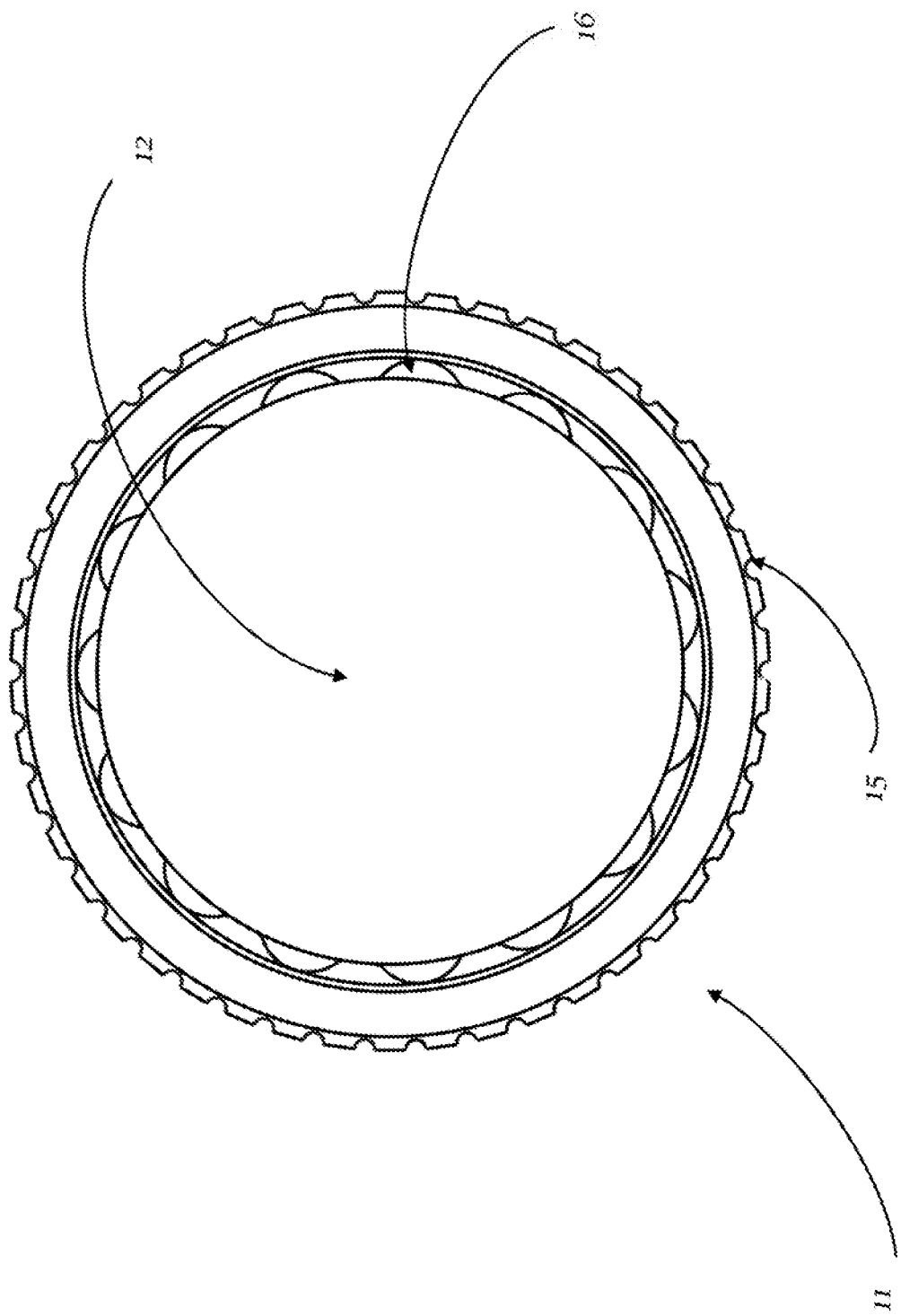
FIG. 7 is a cross-sectional view of a wheel.
Figure 8:
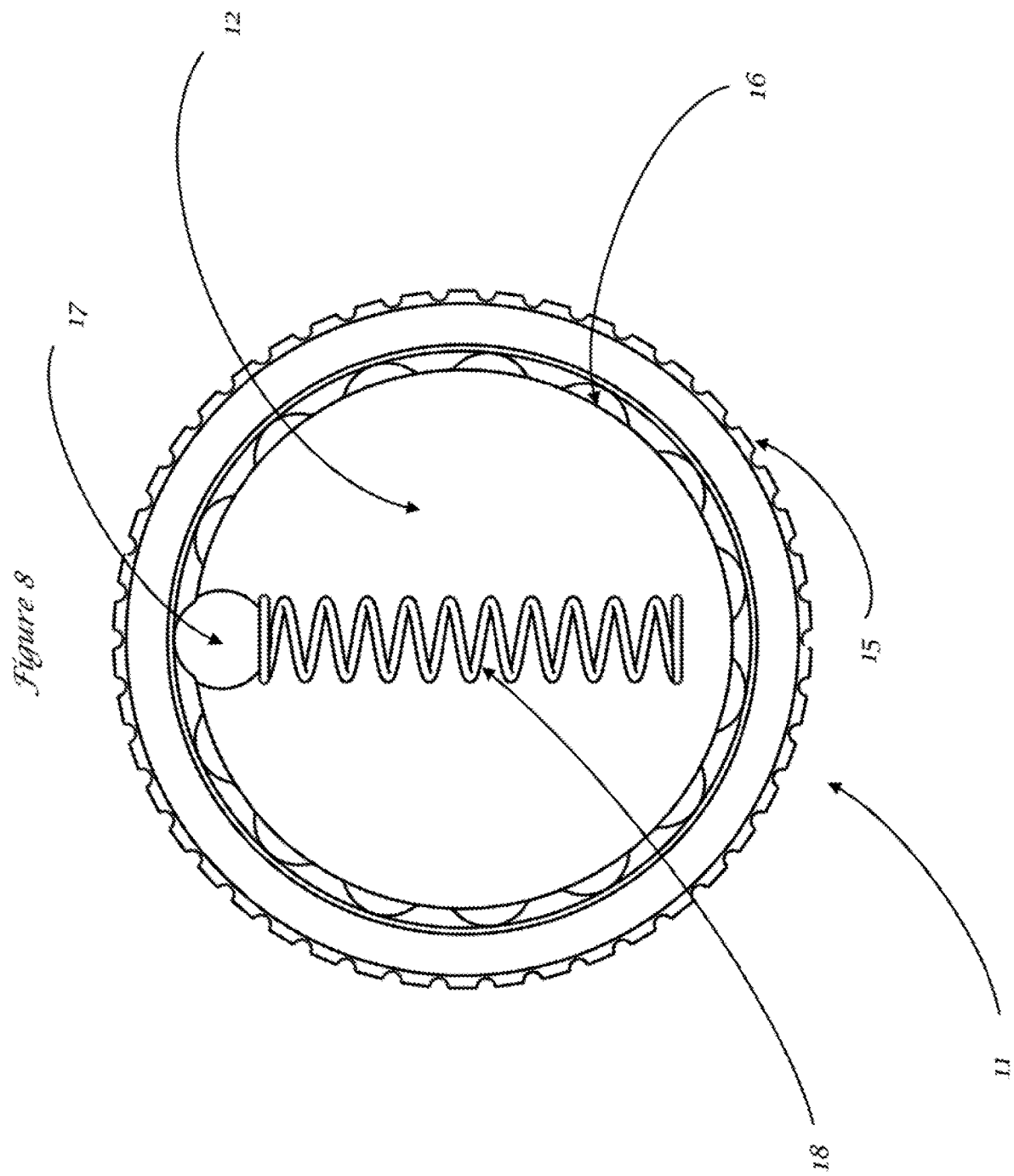
FIG. 8 is a cross-sectional view of a wheel featuring with the spring and ball assembly overlaid to highlight their engagement with the wheel detents.
Figure 9:
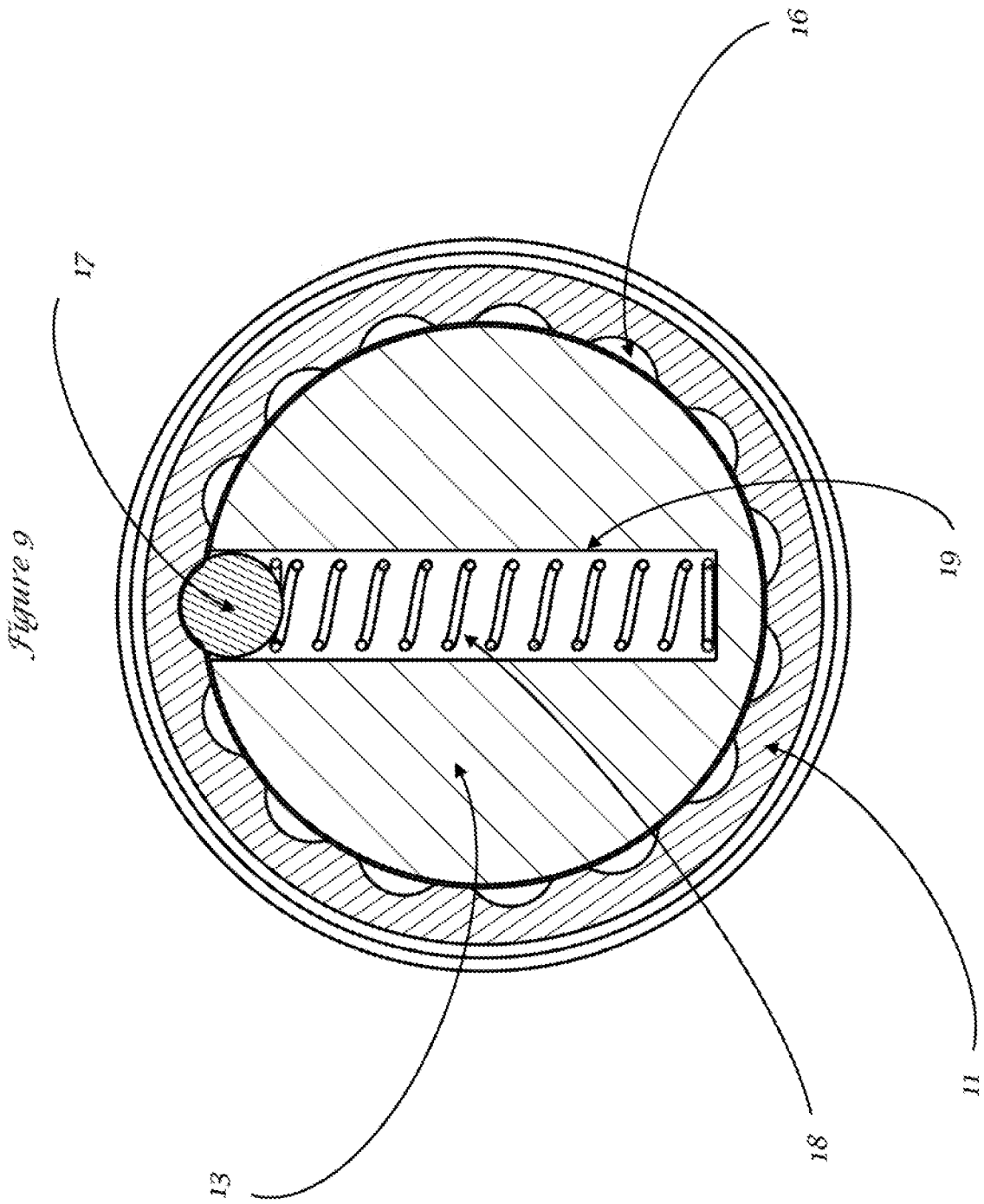
FIG. 9 is a cross-sectional view of the assembled apparatus taken along the axis of a wheel, featuring the engagement of a detent by a ball and spring assembly in the spindle channel.

As more particularly shown in FIG. 6, each wheel 11 is provided with detents 16 equaling the number of characters marked upon the labeling groove 14 on each wheel 11. As illustrated in FIGS. 7-9, the detents 16 ride over a ball 17 and spring 18 arrangement, that are housed in channels 19 of the spindle 13. As highlighted in FIG. 4, the spindle channels 19 are arrayed linearly along the longitudinal axis of the spindle 13 to provide common alignment of the wheels 11.

As the wheels 11 are rotated, the raised area between the detents 16 apply force on the ball 17 and compress the spring 18 into the spindle channel 19. When in the next aligned position, the spring 18 forces the ball 17 into the detent 16, resulting in a clicking sound indicating that each wheel 11 that has been rotated is now in the same alignment as the other wheels 11. Similarly, the latent resistance to rotation beyond the detent 16 by the ball 17 and spring 18 maintain the fixed alignment absent the application of rotational force to the wheel 11, which results in the characters 14 on adjacent wheels 11 also being arranged in a line across the perimeter of each wheel 11.

Figure 10:
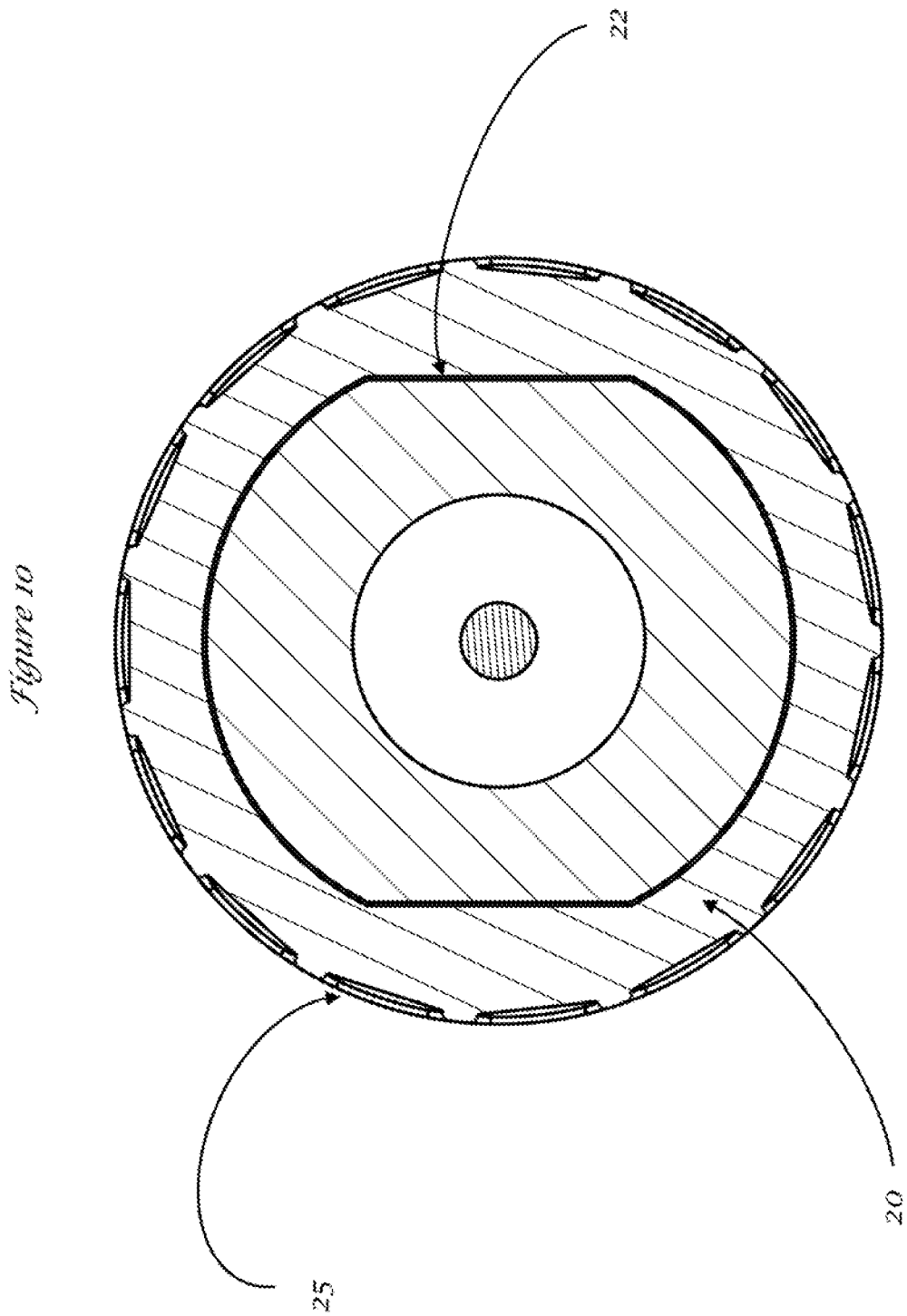
FIG. 10 is a cross-sectional view of the left endcap, featuring the labeling points and endcap alignment tabs.

The wheels 11 are restrained from lateral movement along the spindle by a left endcap 20 and a right endcap 21. Each of the left endcap 20 and the right endcap 21 are aligned to the spindle 13 by means of endcap alignment tabs 22 shown in FIG. 10 that fit into endcap alignment channels 23 on the spindle 12 and are held in place by screws 24. The endcap alignment tabs 22 and endcap alignment channels 23 ensure alignment of labeling points 25 provided on both the left endcap 20 and right endcap 21 with the characters marked in the labeling grooves 14 on wheels 11, which wheels 11 are held such aligned position by the action of the spring 18, ball 17 and detent 16 described above.

The right endcap 21 is fitted with a slot 26 into which a bracket 27 is inserted. The bracket 27 rests in a pair of receivers 28, which allows the bracket to pivot through 180 degrees from a position parallel to the outside face of the right endcap bracket 21 to a position perpendicular to it. The bracket 27 is retained in the receivers 28 by means a bracket retainer 29, which is fitted into the recessed portion of right end cap 21 and held in place by its alignment with the right endcap alignment tabs 22 and compressed between the right endcap 21 and the spindle 12 using the screw 24 described above.

The present invention has been described with respect to one or more specific embodiments that are representative of the invention and are not intended to limit the scope of the invention, which is established by the following claims and reasonable equivalents.

What is claimed is:

1. An apparatus for creating and storing computer passwords, the apparatus comprising an array of M wheels arranged longitudinally on a central spindle, wherein each of the wheels has a plurality of segments and is labeled with a selection of N characters, such that when one or more of the wheels are rotated to create a longitudinal line of characters across one of the plurality of segments of the wheels as a master password known to the user, then N−1 additional, unique password pairs, originally unknown to the user are created along parallel lines of remaining segments of the plurality of segments of the wheels and which, if the wheels are then misaligned for obfuscation of the master password and resultant passwords when not in use, can be realigned by means of reestablishing the master password to recreate the N−1 unique password pairs, wherein the central spindle is equipped with M sets of a spring and ball located in channels, such that each ball engages detents in a corresponding one of the M wheels, there being N detents, to provide alignment of the wheels and the characters thereon longitudinally, together with an audible signal of proper alignment;

wherein the array of M wheels is held in contact with one another by means of endcaps affixed on opposite ends of the center spindle, contacting outer wheels of the array of M wheels;

wherein the endcaps are fitted with indentations or other designated locations for labeling or other unique marks that are longitudinally aligned to the positions established by the detent and spring and ball arrangement, allowing for designation of a created password for a specific account, computer application, or other purpose, and wherein the indentations or other locations for labeling and marking incorporate one instance on either endcap for opposing alignment arrows or similar indications to designate the position of the master password and thereby provide regularity in the alignment of created passwords to the labeling or marking.

2. The apparatus of claim 1, wherein the characters are selected from upper and lower-case letters, numbers, and special characters found on standard computer keyboards.

3. The apparatus of claim 1, wherein the labeling of the wheels incorporates P unique colors on each character as a background to some or all of each of the N characters, thereby providing a further means for creating the master password in addition to use of the characters on the wheel.

4. The apparatus of claim 1, wherein each wheel is fitted with a grip to facilitate rotation.

5. The apparatus of claim 1, where one of the endcaps is fitted with a bracket that allows the apparatus to be affixed to a chain or similar securing means to prevent accidental loss.

* * * * *